(12) United States Patent
Lee

(10) Patent No.: US 6,879,577 B2
(45) Date of Patent: Apr. 12, 2005

(54) METHOD AND APPARATUS FOR DETERMINING FRAME QUALITY IN MOBILE COMMUNICATION SYSTEM

(75) Inventor: Young Jo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 618 days.

(21) Appl. No.: 09/883,342

(22) Filed: Jun. 19, 2001

(65) Prior Publication Data

US 2001/0053128 A1 Dec. 20, 2001

Related U.S. Application Data

(63) Continuation-in-part of application No. 09/223,737, filed on Dec. 31, 1998.

(51) Int. Cl.[7] .................................. H04Q 1/00
(52) U.S. Cl. .................. 370/342; 370/244; 455/522
(58) Field of Search ................. 370/242, 331, 370/342; 375/147, 148; 455/522

(56) References Cited

U.S. PATENT DOCUMENTS 6,175,588 B1 * 1/2001 Visotsky et al. ............ 375/148
6,430,214 B1 * 8/2002 Jalloul et al. ............... 375/147
6,564,042 B1 * 5/2003 Jou et al. .................... 455/522
6,704,370 B1 * 3/2004 Chheda et al. .............. 375/299
2002/0086694 A1 * 7/2002 Tran ........................... 455/522

* cited by examiner

Primary Examiner—Brian Zimmerman
(74) Attorney, Agent, or Firm—Fleshner & Kim, LLP

(57) ABSTRACT

A method and apparatus for determining frame quality in a mobile communication system determines frame quality by estimating a received SIR without using a CRC under a control hold state in which PCBs are only transmitted while no data transmission actually occurs. The method for determining frame quality includes estimating a signal to interference ratio of an allocated traffic channel from PCBs extracted from PCGs of a frame received through the traffic channel and a signal received through a pilot channel received during a section of the PCGs in a state that no data transmission occurs between a mobile station and its control system and the PCBs are only transmitted and received through the traffic channel; and comparing the estimated signal to interference ratio with a preset reference signal to noise power ratio to determine quality of the received frame.

20 Claims, 1 Drawing Sheet

METHOD AND APPARATUS FOR DETERMINING FRAME QUALITY IN MOBILE COMMUNICATION SYSTEM

This application is a continuation-in-part of application Ser. No. 09/223,737 filed Dec. 31, 1998.

BACKGROUND OF THE INVENTION

1. Field of the Invention

The present invention relates to a mobile communication system, and more particularly to, a method and apparatus for determining frame quality in a mobile communication system, in which frame quality is determined by estimating a received signal to interference ratio (SIR) in case where a power control bit (PCB) for maintaining a call is only transmitted and received under a control hold state in which no data transmission actually occurs.

2. Description of the Related Art

In a mobile communication system using a code division multiple access (CDMA), such as a cellular mobile communication system or a personal communication service system, a plurality of mobile stations transmit and receive frames via a base station or a cell-site. The communication path used by a base station to transmit data frames to a user is called a forward link. Conversely, the reverse link refers to the communication path used by a user to transmit data frames back to a base station.

Each of the frames is composed of symbols encoding a digitized voice and data. These frames may fade during transmission through a multipath because reflections in the transmission environment as the mobile stations move. The frames may also fade by an interference of one specific mobile station with another mobile stations due to a high transmission power.

Also, if a certain mobile station is extremely low in power, the associated base station cannot decode the data of a frame transmitted from the mobile station, resulting in a loss of data. Thus, the base station has to control the frame transmission power of the mobile station to adequately decoding the data of the transmitted frame while minimizing the fading of the transmitted frames.

For frame transmission power control, the base station measures the transmission power of the frame transmitted from the mobile station and sends a power control command to the mobile station according to the measured result. The power control command instructs the mobile station to adjust the transmission power. This power control command is composed of a transmission power increment bit or a transmission power decrement bit for maintenance of an average reception power.

The base station transmits the reception power increment bit or reception power decrement bit from the power control bit with the frequency up-processed user data to the mobile station via traffic channel among the CDMA channels of a forward link.

The CDMA channels in the forward link are generally a pilot channel, a synchronous channel, a paging channel and a traffic channel for forward connection and communication from the base station to the mobile station. The CDMA signals through these CDMA channels are orthogonally processed based upon Walsh function codes and processed as orthogonal pairs of a pseudo noise (PN) sequence based upon a fixed chip rate such that the signals can be code-symbolized.

There are two power control methods.

First, in the closed loop power control, the base station measures a transmission rate-based reception power of a signal received from the mobile station, compares the measured reception power with a predetermined power control reference value and sends an appropriate power control command as a result of the measurement together with user data to the mobile station.

Thus, the mobile station adjusts the transmission power in response to the sent power control command and transmits a signal at the adjusted transmission power.

In the closed loop power control, the power control reference value is determined differently for each mobile stations depending on various parameters such as the moving speeds of the mobile station, the surroundings of the mobile stations, etc. Particularly, the base station adjusts the power control reference value appropriately according to a frame error rate of the received data. Such power control is called an outer loop power control.

As discussed above, the conventional power control of the CDMA mobile communication system is mainly a reverse link control.

But, for a high-speed forward link power control, a mobile station is required to measure the power of a CDMA signal received from a base station and determining which one of the CDMA channels is to be observed and used for the power control.

Meantime, in case of packet data service, data transmission successively occurs while a call is set. In many cases, data transmission discontinuously occurs. Also, although the BS transmits data, data transmission may occur intermittently in a terminal unit. In each case, a medium access control (MAC) layer manages resources using a state-machine to effectively control the capacity of the BS.

In the communication system that provides high rate packet data services, the MAC layer is implemented by an active state, a dormant state, a control hold state, and a suspended state.

The control hold state and the suspended state serve to eliminate interference by an idle user signal that exists in the active state. The control hold state and the suspended state also serve to eliminate overhead generated as a relatively long time is required to transit the dormant state to the active state.

Accordingly, the control hold state and the suspended state exist between the active state and the dormant state. The control hold state means that the PCBs are only transmitted through the traffic channel to maintain a call when no transmission data exists.

Particularly, if transmission data occurs again under the control hold state, the control hold state is transited to the active state so that actual data transmission occurs.

In the communication system that provides high rate packet data services, it is necessary to measure frame quality for outer loop power control for reverse link power control, forward link power control, and channel state monitoring.

However, in case of the communication system that provides high rate packet data services, it is impossible to measure frame quality by the CRC under the control hold state. That is, since the CRC determines whether a receiving frame is poor to measure frame quality, it is impossible to measure frame quality under the control hold state in which no data transmission actually occurs.

SUMMARY OF THE INVENTION

To solve the above problems, an object of the present invention is to provide a method and apparatus for determining frame quality in a mobile communication system, in which frame quality is determined by estimating a received SIR.

Another object of the present invention is to provide a method apparatus for determining frame quality for controlling power on forwarding link in a mobile communication system To achieve the above object, a method for determining frame quality in a mobile communication system according to the present invention includes the steps of: estimating a signal to noise power ratio of an allocated traffic channel from PCBs extracted from PCGs of a frame received through the traffic channel and a signal received through a pilot channel received during a section of the PCGs in a control hold state; and comparing the estimated signal to noise power ratio with a preset reference signal to noise power ratio to determine quality of the received frame.

Preferably, the signal to noise power ratio is estimated by multiplying a bit to symbol rate ratio of a full rate by a value obtained by dividing the power for the traffic channel of the full rate by the noise power of the received traffic channel.

The power for the traffic channel of the full rate is estimated by accumulating a value obtained by dividing the power corresponding to the PCB in an arbitrary PCG included in the traffic channel by the power corresponding to the PCB in a pilot channel, during one frame.

The noise power is the sum of the power of interference signals by users in one cell and different cells.

A corresponding mobile station or system controls a power control reference value to maintain its target frame error rate, determines an erasure indicator bit value which will be used to control transmitting power of an opposing mobile station or system, or checks a channel of a received signal and determines whether to drop a set call, in accordance with the determined frame quality.

To further achieve the above object, an apparatus for determining frame quality in a mobile communication system according to the present invention includes: a PCB extracting unit for extracting PCBs from PCGs of a frame received through an allocated traffic channel in a state that no data transmission occurs between a mobile station and its control system and the PCBs are only transmitted and received through the traffic channel; an SIR estimating unit for estimating a signal to noise power ratio of the traffic channel from the extracted PCBs and a signal received through a pilot channel received during a section of the PCGs; and a comparator for comparing the estimated signal to noise power ratio with a preset reference value to generate a quality indicator bit of the received frame.

It is to be understood that both the foregoing general description and the following detailed description are exemplary and explanatory and are intended to provide further explanation of the invention as claimed.

BRIEF DESCRIPTION OF THE DRAWINGS

Other objects, characteristic features and advantages of the present invention will now become apparent with a detailed description of an embodiment made with reference to the accompanying drawing, in which.

DETAILED DESCRIPTION OF PREFERRED EMBODIMENTS

Figure 1:
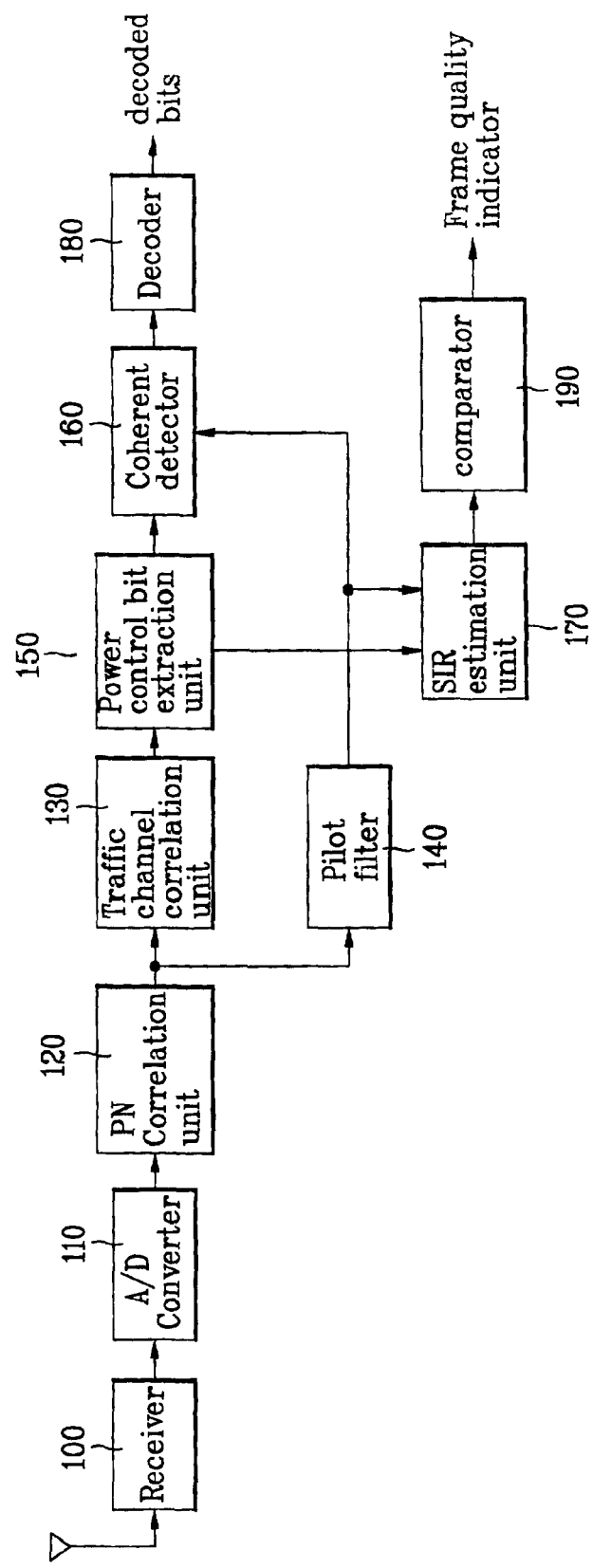
FIG. 1 is a block diagram showing an apparatus for determining frame quality in accordance with the present invention.

The following is a detailed description of a preferred embodiment of a method and apparatus for determining frame quality in a mobile communication system according to the present invention made with reference to the accompanying drawing.

In the present invention, under a control hold state implemented by an MAC layer in a mobile communication system that provides high rate packet data services, quality of a received frame is determined by estimating a received signal to interference ratio (SIR) in case where PCBs are only transmitted and received through an allocated traffic channel to maintain a call while no data transmission actually occurs.

In the related art, quality of the received frame has been measured by CRC and the measured result has been applied for power control or channel state monitoring. However, in the present invention, since quality of the received frame should be measured under the control hold state in which no received data exists, a received SIR is estimated without CRC. This is shown in FIG. 1.

The interference in the SIR includes interference from users within one cell or different cells and will now be referred to $N_r$.

Furthermore, in the present invention, quality of the received frame is measured in such a manner that outer loop power control for high rate power control, low rate power control, and channel state monitoring are performed even under the control hold state in which no received data exists.

Particularly, while frame quality has been measured by the CRC that determines whether the received frame is poor in the related art outer loop power control for high rate power control and low rate power control, frame quality is not measured by the CRC in the present invention because no data transmission actually occurs.

Furthermore, in the present invention, the measured result of frame quality by estimation of the received SIR is also applied to channel state monitoring that conventionally determines call drop by determining whether successive received frames are poor.

FIG. 1 is a block diagram showing an apparatus for determining frame quality in accordance with the present invention.

Referring to FIG. 1, the apparatus for determining frame quality in accordance with the present invention includes an A/D converter 110 for converting a high frequency signal received in a receiver 100 to a digital signal of a base band, a PN correlation unit 120 for correlating the digital signal with a PN code so as to despread the digital signal, a traffic channel correlation unit 130 for correlating the despread signal with a walsh code allocated to the traffic channel so as to demodulate a signal transmitted from the despread signal through the traffic channel, a pilot filter 140 for low pass filtering the despread signal, and a PCB extracting unit 150 for extracting PCBs from an output signal of the traffic channel correlation unit 130. The apparatus further includes a coherent detector 160 for multiplying the output of the PCB extracting unit 150 by the output of the pilot filter 140 by means of complex conjugation so as to estimate and compensate signal attenuation and phase shifted information caused when a transmitting signal passes through a radio channel (i.e., multipath fading channel), a decoder 180 for decoding the detected frame by compensating of the coherent detector 160, an SIR estimating unit 170 for estimating a received SIR from output signals of the PCB extracting unit 150 and the pilot filter 140, and a comparator 190 for comparing the output of the SIR estimating unit 170 with a reference SIR value to output a quality indicator bit of a corresponding frame.

In FIG. 1, if PCBs for maintaining a call are only transmitted and received through the allocated traffic channel while no actual data transmission occurs in the same manner as the control hold state, i.e., if no CRC is used, the received SIR is estimated to determine frame quality.

The principles for determining frame quality according to the present invention will now be described.

In the present invention, to estimate the received SIR, it is necessary to estimate power for the traffic channel through which no data transmission currently occurs and power for an interference signal obtained from a pilot channel.

The power for the traffic channel through which no data transmission occurs is estimated by the pilot channel and the PCB. Since the transmission power of the pilot channel is fixed, it is easy to estimate time variable path loss. The PCB is used to obtain a power ratio of the pilot channel and the traffic channel of a full rate.

The power $\overline{E}_{traffic}$ for the traffic channel of the full rate is estimated by the following equation (1).

$$E_{traffic} = E_{pilot} \times \frac{1}{L} \sum_{l=1}^{L} \left\{ a_1 \times \left( \frac{E_{traffic,PCB}}{E_{pilot,PCB}} \right)_l \right\} \quad (1)$$

In the above equation (1), $E_{pilot}$ represents the power of a pilot symbol received through the pilot channel, $E_{traffic,PCB}$ represents the power of the PCB received through the traffic channel during a period corresponding to PCB of 1 PCG, and $E_{pilot,PCB}$ represents the power of a signal received through the pilot channel during a period corresponding to PCB of 1PCG of the traffic channel.

Also, in the above equation (1), $a_1$ represents a weight value to a traffic-to-pilot power ratio obtained during 1 PCG period.

For example, if a value of $a_1$ is 1 and a value of L is the number of PCGs of one frame, the power $\overline{E}_{traffic}$ for the traffic channel of a full rate is obtained by accumulating $$\frac{E_{traffic,PCB}}{E_{pilot,PCB}}$$

during one frame.

Using the equation (1), a signal to interference ratio $E_b/N_t$ for the currently received traffic channel is obtained as follows.

$$\frac{trafficE_b}{N_t} = k \frac{\overline{E}_{traffic}}{N_t} \quad (2)$$

In the above equation (2), k represents a bit-to-symbol rate of the full rate, and $N_t$ includes interference by other users within the same cell (service area) and interferences by users within different cells.

The signal to interference ratio $E_b/N_t$ for the currently received traffic channel as obtained by the equation (2) represents a received SIR. The received SIR is compared with a reference SIR to obtain corresponding frame quality.

The configuration of FIG. 1 based on the aforementioned principles will now be described.

The configuration of FIG. 1 is a part of the communication system that provides high rate packet data services. A final frame quality indicator is generated to measure frame quality for control under the control hold state in which no received data exists.

To this end, a high frequency CDMA signal input to a receiving antenna is converted to an intermediate frequency CDMA signal in a receiver 100.

Then, the A/D converter 110 converts the intermediate frequency CDMA signal to a digital signal of a base band frequency.

The PN correlation unit 120 correlates a PN code provided by a PN code generator (not shown) with the converted digital signal so that the digital signal is despread.

Afterwards, the traffic channel correlation unit 130 correlates a walsh code allocated to the traffic channel with the despread signal so as to demodulate a code symbol received through the traffic channel.

The PCB extracting unit 150 extracts only PCBs from each received frame of the traffic channel in which initial offsets are synchronized with one another by correlation of the traffic channel correlation unit 130. At this time, the PCB extracting unit 150 extracts PCBs per frame transmitted to each PCG period and transmits the extracted PCBs to the SIR estimating unit 170.

Meanwhile, an output signal of the PN correlation unit 120 provided to the pilot filter 140 is low pass filtered and then provided to the coherent detector 160 and the SIR estimating unit 170.

The coherent detector 160 multiplies the output of the PCB extracting unit 150 by the output of the pilot filter 140 by means of complex conjugation so as to estimate and compensate signal attenuation and phase shifted information caused when a transmitting signal passes through a radio channel (i.e., multipath fading channel). The detected receiving frame by compensating of the coherent detector 160 is decoded by the decoder 180.

Consequently, the SIR estimating unit 170 estimates a signal to interference ratio $E_b/N_t$ (received SIR) for the currently received traffic channel by applying the outputs of the PCB extracting unit 150 and the pilot filter 140 to the equations (1) and (2).

To estimate the received SIR, a bit to symbol rate ratio k of the full rate is multiplied by a value obtained by dividing the power $E_{traffic}$ for the traffic channel of the full rate by interference $N_t$ by different users within the same cell (service area) and users within different cells (equation (2)). In this case, the power $E_{traffic}$ for the traffic channel of the full rate is obtained by the equation (1) as described above.

The received SIR obtained by the SIR estimating unit 170 is input to the comparator 190. The comparator 190 compares the received SIR with a reference SIR which is a threshold value and then outputs the resultant value. The reference SIR is set by a value that satisfies quality of service (QoS).

The resultant value output from the comparator 190 is a frame quality indicator generated to control the present invention and is used for outer loop power control for high rate power control, low rate power control, and channel state monitoring in the communication system that provides high rate packet data services.

This will be described in more detail.

First, in case of outer loop power control for high rate power control, a power control reference value is controlled to maintain a target FER based on the frame quality indicator generated as above.

Second, in case of low rate power control, an erasure indicator bit value transmitted to a transmitting party to control transmitting power of an opposing system depending on the receiving state is determined based on the frame quality indicator. The erasure indicator bit value represents either an instruction to reduce the power of an opposing transmitter because the current receiving state is good or an instruction to increase the power of an opposing transmitter because the current receiving state is poor.

Third, in case of channel state monitoring, since it is impossible to determine call drop by determining whether a certain number of successive receiving frames are poor, the current channel state is checked based on the frame quality indicator to determine call drop.

As aforementioned, the method and apparatus for determining frame quality has the following advantages.

When frame quality cannot be measured by the CRC in the communication system that provides high rate packet data services, i.e., when the PCBs for maintaining a call are only transmitted under the control hold state in which no data transmission actually occurs, frame quality can be determined by estimating the signal to interference ratio $E_b/N_t$ (received SIR) for the current traffic channel. This facilitates outer loop power control for high rate power control, low rate power control, and channel state monitoring.

The above description will enable one skilled in the art to modify and revise the invention within the spirit not degrading the technical concept of the present invention. However, the technical scope of the present invention is not limited to the above description of the embodiment but shall be determined by the claims.

What is claimed is:

1. A method for determining a frame quality in a mobile communication system comprising:

estimating a signal to interference ratio based on multiplying a bit to symbol rate ratio of a full rate by a value obtained by dividing a power for a traffic channel of the full rate by interference in a control hold state; and comparing the estimated signal to interference ratio with a preset reference to determine the quality of the received frame.

2. The method of claim 1, wherein the control hold state corresponds to a state when only Power Control Bits (PCBs) are transmitted.

3. The method of claim 1, further comprising:

determining whether to drop a set call based on a frame quality indicator.

4. The method of claim 1, wherein the interference is the sum of the interference of a same cell and another cell.

5. The method of claim 1, further comprising:

controlling a power control reference value to maintain a target frame error rate in a corresponding mobile station or system based on the determined frame quality.

6. The method of claim 1, wherein an erasure indicator bit is determined based on the determined frame quality to control a transmit power.

7. An apparatus for determining a frame quality in a mobile communication system comprising:

an SIR (Signal to Interference Ratio) estimating unit for estimating a signal to interference ratio based on multiplying a bit to symbol rate ratio of a full rate by a value obtained by dividing a power for a traffic channel of the full rate by interference in a control hold state; and a comparator for comparing the estimated signal to interference ratio with a preset reference to determine the quality of the frame.

8. The apparatus of claim 7, wherein a corresponding mobile station or system determines whether to drop a set call based on a frame quality indicator.

9. The apparatus of claim 7, wherein the interference is the sum of interference of a same cell and another cell.

10. The apparatus of claim 7, further comprising:

a controller for controlling a power control reference value to maintain a target frame error rate in a corresponding mobile station or system based on the quality indicator bit.

11. The apparatus of claim 7, wherein an erasure indicator bit is determined based on the quality indicator bit to control a transmit power.

12. A method for determining a frame quality in a mobile communication system, comprising:

determining a quality of the frame received through an allocated traffic channel in a control hold state in which only Power Control Bits (PCBs) are transmitted, wherein the quality of the frame is determined by estimating a signal to interference ratio based on the traffic channel and a pilot channel during the control hold state.

13. The method of claim 12, wherein a power of the traffic channel is estimated based on a power control bit power and a pilot channel power corresponding to the power control bit.

14. The method of claim 12, wherein an erasure bit is determined based on the determined frame quality to control a transmitting power.

15. The method of claim 12, further comprising:

determining whether to drop a set call based on a frame quality indicator.

16. The method of claim 12, further comprising:

transmitting a frame quality indicator generated based on the determined frame quality.

17. The method of claim 12, further comprising:

comparing the estimated signal to interference ratio with a preset reference value to determine the quality of the frame.

18. The method of claim 12, further comprising:

extracting at least one of the PCBs from power control groups of the frame.

19. The method of claim 12, wherein the signal to interference ratio is estimated by a power of the traffic channel based on the power control bit and a power of the pilot channel.

20. The method of claim 12, wherein the signal to interference ratio is estimated by multiplying a bit to symbol rate ratio of a full rate by a value obtained by dividing the power for the traffic channel of the full rate by the interference.

* * * * *